(12) United States Patent
Strickland et al.

(10) Patent No.: US 7,293,198 B2
(45) Date of Patent: Nov. 6, 2007

(54) TECHNIQUES FOR MAINTAINING OPERATION OF DATA STORAGE SYSTEM DURING A FAILURE

(75) Inventors: Stephen Strickland, Marlboro, MA (US); John V. Burroughs, Mason, MA (US); Timothy Dorr, Lancaster, MA (US)

(73) Assignee: EMC Corporation, Hopkinton, MA (US)

( * ) Notice: Subject to any disclaimer, the term of this patent is extended or adjusted under 35 U.S.C. 154(b) by 423 days.

(21) Appl. No.: 10/808,839

(22) Filed: Mar. 25, 2004

(65) Prior Publication Data

US 2005/0223284 A1 Oct. 6, 2005

(51) Int. Cl.
*G06F 11/00* (2006.01)

(52) U.S. Cl. .................... 714/15; 714/21; 714/51; 714/6

(58) Field of Classification Search ............. 714/4, 714/5, 6, 15, 22, 51
See application file for complete search history.

(56) References Cited

U.S. PATENT DOCUMENTS

| | | | | |
|---|---|---|---|---|
| 5,283,792 A | * | 2/1994 | Davies et al. ............... | 714/22 |
| 5,774,640 A | * | 6/1998 | Kurio ........................... | 714/4 |
| 5,991,844 A | | 11/1999 | Khosrowpour ............ | 710/129 |
| 6,633,905 B1 | | 10/2003 | Anderson et al. ........... | 709/219 |
| 6,678,639 B2 | | 1/2004 | Little et al. ................. | 702/188 |
| 6,681,282 B1 | * | 1/2004 | Golden et al. .............. | 710/302 |
| 6,873,268 B2 | | 3/2005 | Lebel et al. ........... | 340/870.16 |
| 6,910,148 B1 | * | 6/2005 | Ho et al. ........................ | 714/4 |
| 7,039,737 B1 | * | 5/2006 | Dorr et al. ................... | 710/240 |

FOREIGN PATENT DOCUMENTS

| WO | WO 98/33120 | 7/1998 |
|---|---|---|
| WO | WO 02/50678 | 6/2002 |

\* cited by examiner

*Primary Examiner*—Scott Baderman
*Assistant Examiner*—Tim Bonura
(74) *Attorney, Agent, or Firm*—BainwoodHuang

(57) ABSTRACT

A data storage system has a first storage processor, a second storage processor, and a communications subsystem. The communications subsystem has (i) an interfacing portion interconnected between the first storage processor and the second storage processor, (ii) a clock circuit coupled to the interfacing portion, and (iii) a controller coupled to the interfacing portion and the clock circuit. The controller is configured to enable operation of the interfacing portion to provide communications between the first and second storage processors, sense a failure within the clock circuit, and reset the interfacing portion in response to the sensed failure to enable one of the first and second storage processors to continue operation. Such resetting of the interfacing portion prevents the remaining storage processor from locking up, thus freeing that storage processor so that it is capable of continuing to operate even after the failure.

12 Claims, 4 Drawing Sheets

TECHNIQUES FOR MAINTAINING OPERATION OF DATA STORAGE SYSTEM DURING A FAILURE

BACKGROUND

A data storage system stores and retrieves information on behalf of one or more external host computers. A typical data storage system includes a network adapter, storage processing circuitry, and a set of disk drives. The network adapter provides connectivity between the external host computers and the storage processing circuitry. The storage processing circuitry performs a variety of data storage operations (e.g., load operations, store operations, read-modify-write operations, etc.) as well as provides cache memory which enables the data storage system to optimize its operations (e.g., to provide high-speed storage, data pre-fetching, etc.). The set of disk drives provides robust data storage capacity but in a slower and non-volatile manner.

The storage processing circuitry of some data storage systems includes multiple storage processing units for greater availability and/or greater data storage throughput. In such systems, each storage processing unit is individually capable of performing data storage operations.

For example, one conventional data storage system includes two storage processing units which are configured to communicate with each other through a Cache Mirroring Interface (CMI) bus in order to maintain cache coherency as well as to minimize the impact of cache mirroring disk writes. In particular, the CMI bus enables a copy of data to be available on both storage processing units before the disk write operation is complete. In this system, a first storage processing unit has a first CMI interface circuit, a second storage processing unit has a second CMI interface circuit, and the first and second CMI interface circuits connect to each other through the CMI bus.

SUMMARY

Unfortunately, there are certain limitations to the above-described conventional data storage system. For example, during operation of that data storage system, there may be a failure within the CMI related circuitry (e.g., a clock failure, an arbiter failure, etc.) or a failure in one of the storage processing units. For instance, suppose that one of the CMI interface circuits is in the process of issuing a command on the CMI bus when such a failure occurs in the opposite CMI interface circuit. In this situation, there is a chance of the non-failing CMI interface circuit hanging and, in turn, locking up the operation of its storage processing unit. If this happens, the data storage system as a whole will be prevented from performing further data storage operations.

Additionally, most conventional data storage systems with multiple storage processors include an expensive redundant power supply setup having multiple power supplies so that, if a power supply fails, the failure will not take down the system. Unfortunately, if this redundant power supply setup were replaced with less expensive, standard power supplies, there is a risk that a user could inadvertently pull out the AC cord and cause a loss of power that is not a power supply fault and thus damage circuitry (e.g., a storage processor) that otherwise has no faults.

In contrast to the above-described conventional data storage system, embodiments of the invention are directed to techniques for maintaining operation of a data storage system having multiple storage processors during a failure (e.g., a single point failure within a portion of a communications subsystem disposed between the storage processors). In particular, such techniques guard against inadvertently locking up a remaining storage processor to preserve availability of the data storage system as a whole (i.e., to enable a storage processor to continue to operate). Additionally, such techniques enable the use of less expensive, standard power supplies to power each storage processor separately and to provide shared power locally for shared resources such as the communications subsystem thus providing both a costs savings as well as reliable fault tolerance. That is, these techniques enable the use of a low cost commodity part to reduce total costs without compromising overall reliability.

One embodiment of the invention is directed to a data storage system having a first storage processor, a second storage processor, and a communications subsystem. The communications subsystem has (i) an interfacing portion interconnected between the first storage processor and the second storage processor, (ii) a clock circuit coupled to the interfacing portion, and (iii) a controller coupled to the interfacing portion and the clock circuit. The controller is configured to enable operation of the interfacing portion to provide communications between the first and second storage processors, sense a failure within the clock circuit, and reset the interfacing portion in response to the sensed failure to enable one of the first and second storage processors to continue operation. Such resetting of the interfacing portion prevents the remaining storage processor from locking up, thus freeing that storage processor so that it is capable of continuing to operate even after the failure.

In one arrangement, the interfacing portion of the communications subsystem includes a first interface coupled to the first storage processor, a second interface coupled to the second storage processor, and a switch coupled to the controller of the communications subsystem. The switch is disposed between the first and second interface. In this arrangement, the controller is configured to open the switch in response to loss of a power supply signal from either a first power supply that powers the first interface or a second power supply that powers the second interface. Accordingly, any voltage provided by the remaining interface will not damage the interface that has lost power.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for maintaining operation of a data storage system having multiple storage processors during a failure (e.g., a single point failure within a portion of a communications subsystem disposed between the storage processors). In particular, such techniques guard against inadvertently locking up a remaining storage processor to preserve availability of the data storage system as a whole (i.e., to enable a storage processor to continue to operate). Furthermore, such techniques enable the use of less expensive, standard power supplies to power each storage processor separately and to provide shared power locally for shared resources such as the communications subsystem thus providing both a costs savings as well as reliable fault tolerance. That is, these techniques enable the use of a low cost commodity part to reduce total costs without compromising overall reliability.

Figure 1:
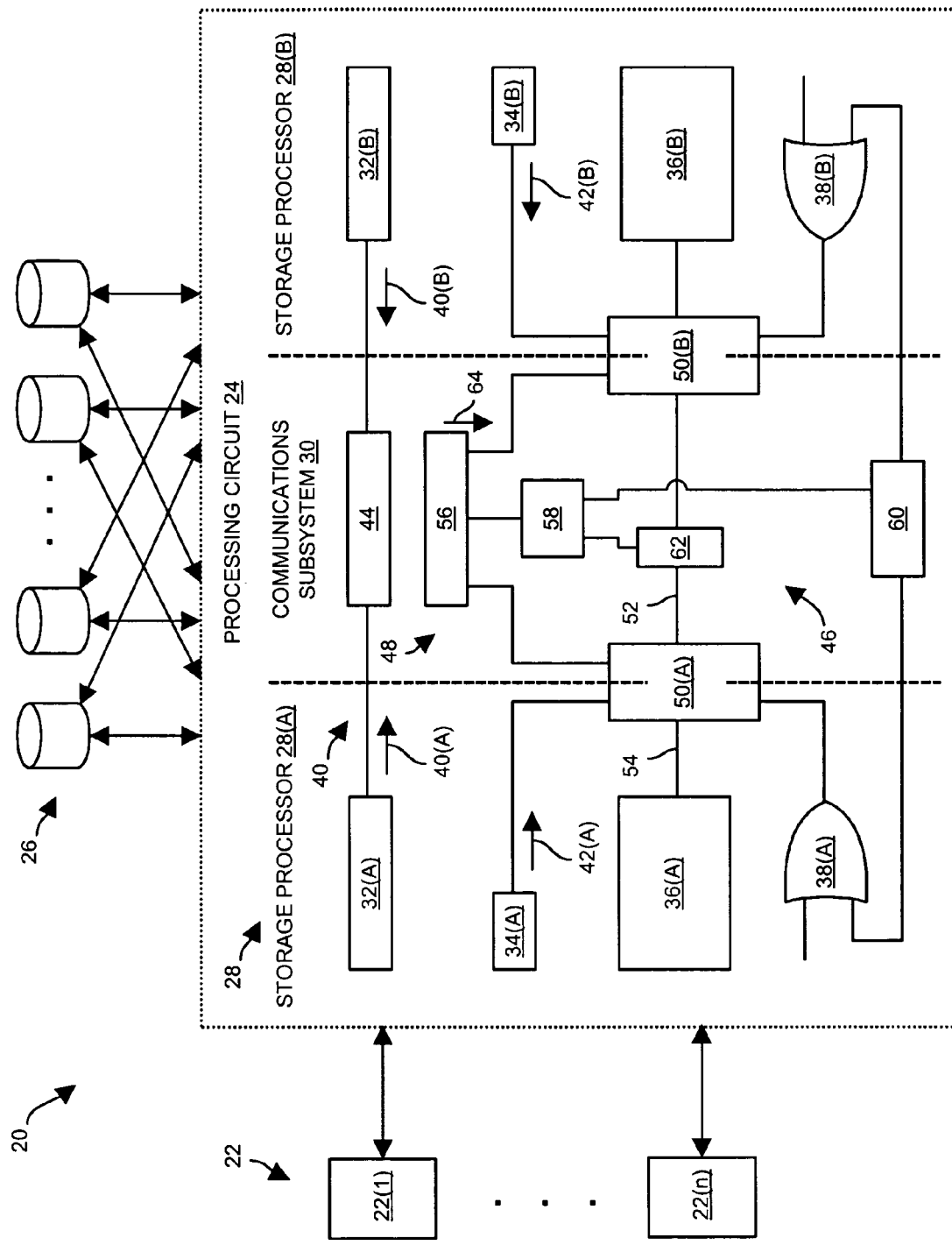
FIG. 1 is a block diagram of a data storage system which is suitable for use by the invention.

FIG. 1 shows a data storage system 20 which is suitable for use by the invention. The data storage system 20 is configured to store and retrieve information on behalf of a set of external hosts 22(1), . . . , 22(n) (collectively, hosts 22). The data storage system 20 may include one or more network interfaces (not shown for simplicity) to enable the data storage system 20 to communication with the hosts 22 using a variety of different protocols, e.g., TCP/IP communications, Fibre Channel, count-key-data (CKD) record format, block I/O, etc.

As shown in FIG. 1, the data storage system 20 includes a processing circuit 24 and an array of storage devices 26 (e.g., disk drives). The processing circuit 24 includes storage processors 28(A), 28(B) (collectively, storage processors 28) and a Cache Mirroring Interface (CMI) communications subsystem 30 disposed between the storage processors 28. The storage processors 28 are configured to individually perform data storage operations on behalf of the hosts 22. Additionally, the storage processors 28 are configured to communicate with each other through the CMI communications subsystem 30. In particular, the storage processors 28 exchange commands and data in accordance with the CMI protocol to maintain cache coherency as well as to minimize the impact of cache mirroring on overall system performance.

As further shown in FIG. 1, the storage processor 28(A) includes a power supply 32(A), a local clock 34(A), a control circuit 36(A), and additional logic 38(A). The control circuit 36(A) is essentially the processing engine of the storage processor 28(A) in that it performs data storage operations (e.g., load and store operations, caching operations, etc.) based on a power supply signal 40(A) from the power supply 32(A) and a clock signal 42(A) from the local clock 34(A). It should be understood that the particular power planes/lines and clock traces carrying these signals 40(A), 42(A) to the control circuit 36(A) have been purposefully omitted from FIG. 1 for simplicity.

Similarly, the storage processor 28(B) includes a power supply 32(B), a local clock 34(B), a control circuit 36(B), and additional logic 38(B). In connection with the storage processor 28(B), the control circuit 36(B) (i.e., the processing engine) is powered by a power supply signal 40(B) from the power supply 32(B) and is driven by a clock signal 42(B) from the local clock 34(B). Again, the particular power planes/lines and clock traces carrying these signals 40(B), 42(B) to the control circuit 36(B) have been purposefully omitted from FIG. 1 for simplicity.

As further shown in FIG. 1, the communications subsystem 30 includes a common power source 44, an interfacing portion 46 and a control portion 48. The common power source 44 receives the power signals 40(A), 40(B) (collectively, the power signals 40) from the power supplies 32(A), 32(B) (collectively, the power supplies 32), and provides common power (i.e., local shared power) to various components of the communications subsystem 30. Accordingly, if one of the power supplies 32 were to fail, the various components would be able to continue to operate based on power provided by the remaining power supply 32.

The interfacing portion 46 is interconnected between the storage processor 28(A) and the storage processor 28(B) and provides a CMI communications pathway between the storage processors 26 to enable the storage processors 26 to coordinate their operations. The control portion 48 controls the operation of the interfacing portion 46. A more detailed explanation of the communications subsystem 30 will now be provided.

The interfacing portion 46 includes a first interface device 50(A) coupled to the first storage processor 28(A), a second interface device 50(B) coupled to the second storage processor 28(B), and a CMI bus 52 connecting the interface devices 50(A), 50(B) (collectively, interface devices 50) together. By way of example only, each interface device 50 is a packaged, off-the-shelf component which provides a CMI interface on one side, and a PCI interface on the other. Accordingly, the control circuits 36(A), 36(B) (collectively, control circuits 36) connect to the interface devices 50 through buses 54 which are local PCI buses.

To support operation of the interface devices 50, the control portion 48 of the communications subsystem 30 includes a clock circuit 56, a controller 58, a watchdog circuit 60 and a switch 62. The clock circuit 56 is configured to output a common clock signal 64. The interface devices 50, which are coupled to the clock circuit 56, use the common clock signal 64 for communications through the CMI bus 52 and use the local clock signals 42(A), 42(B) (collectively, local clock signals 42) for communications through the local buses 54. The dashed lines passing through the interface devices 50 are meant to illustrate the locally-synchronized operation of the interface devices 50 based on these clock signals 64, 42.

The controller 58, which couples to the clock circuit 56 and the interface devices 50, is configured to enable operation of the interfacing portion 46 (i.e., the interface devices 50) and thus enable communications between the storage processors 28 through the CMI bus 52. The controller 58 is configured to detect and handle certain failures of a critical nature in order to prevent the communications subsystem 30 from locking up the data storage system 20 as a whole. For example, the controller 58 is configured to sense a failure within the clock circuit 56 (e.g., loss of the clock signal 64), and reset the interfacing portion 46 in response to the sensed failure to enable one of the storage processors 28 to continue operation and thus maintain overall availability of the data storage system 20. Further details of this feature will now be provided with reference to FIG. 2.

Figure 2:
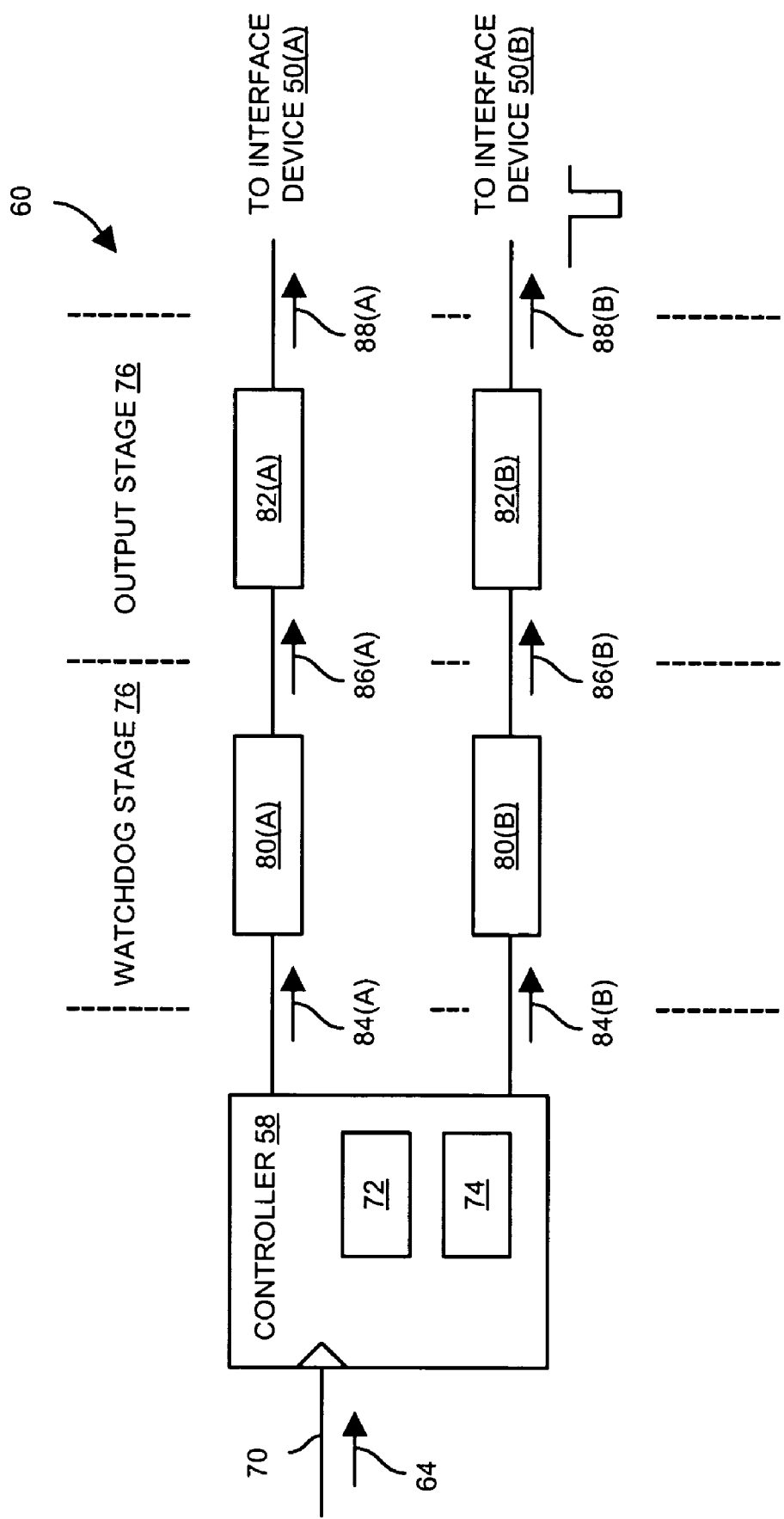
FIG. 2 is a block diagram of a portion of a communications subsystem of the data storage system of FIG. 1.

FIG. 2 shows the controller 58 and the watchdog circuit 60 of the communications subsystem 30. The controller 58 includes a clock input 70, arbiter circuitry 72 and a divider 74. The watchdog circuit 60 includes a watchdog stage 76 and an output stage 78. The watchdog stage 76 includes individual watchdog elements 80(A), 80(B) (collectively, watchdog elements 80) which correspond to the respective storage processors 28(A), 28(B). Similarly, the output stage 78 includes individual output elements 82(A), 82(B) (collectively, output elements 82) which connect to the interface devices 50(A), 50(B), respectively, and thus correspond to the respective storage processors 28(A), 28(B).

During operation, the clock input 70 receives the common clock signal 64 from the clock circuit 56, and the arbiter circuitry 72 coordinates operations between the storage processors 28 in accordance with the CMI protocol. Additionally, the divider 74 (e.g., a counter) counts clock pulses of the clock signal 64 and outputs respective divider signals 84(A), 84(B) (collectively, divider signals 84) to the watchdog elements 80. Each divider signal 84 has a periodicity which is longer than that of the clock signal 64. In one arrangement, the divider 74 is a divide-by-32 circuit which cuts the clock frequency by 32. In other arrangement, the divider 74 is a divide-by-64 circuit which cuts the clock frequency by 64.

The watchdog elements 80 of the watchdog stage 76 monitor the divider signals 84 for heartbeats, i.e., clock pulses, acts upon the interface devices 50 if a clock pulse is not seen within a predetermined time period (e.g., a few seconds). In particular, the watchdog element 80(A) provides a control signal 86(A) to the output element 82(A) which controls whether an output signal 88(A) enables or resets the interface device 50(A) of the storage processor 28(A). Similarly, the watchdog element 80(B) provides a control signal 86(B) to the output element 82(B) which controls whether an output signal 88(B) enables or resets the interface device 50(B) of the storage processor 28(B).

This operation enables the watchdog circuit 60 to reset the interface portion 46 and thus avoid hanging the data storage system 20 as a whole if there is a failure of the clock circuit 44 or arbiter circuitry 72. In particular, as long as the watchdog elements 80 receive clock pulses within the predetermined time period, the watchdog elements 80 direct the output elements 82 to enable operation of the interface devices 50. However, if a watchdog element 80 (e.g., the output element 82(B)) times out by failing to receive a clock pulse within the timeout period, that watchdog element 80 outputs an error signal (e.g., a different voltage for the control signal 86(B)) causing the corresponding output element 82 (e.g., the output element 82(B)) to output a reset signal (e.g., a reset pulse within the output signal 88(B), see FIG. 2) and thus reset its respective interface device 50 (e.g., the interface device 50(B)). In one arrangement, the interface device 50 stays in a reset mode until the entire data storage system 20 performs a recovery or reset procedure.

As described above, after a single point failure within the communications subsystem 30 (e.g., failure of the clock circuit 56 or arbiter 72), the reset interface device 50 is effectively disabled in a manner that allows the storage processor 28 (e.g., the storage processor 28(B)) to maintain operation in a fault tolerant manner. That is, the storage processor 28 is not locked up by its interface device 50 and is thus capable of continuing to perform data storage operations on behalf of the hosts 22. Further details of embodiments of the invention will now be provided with reference to FIG. 3.

Figure 3:
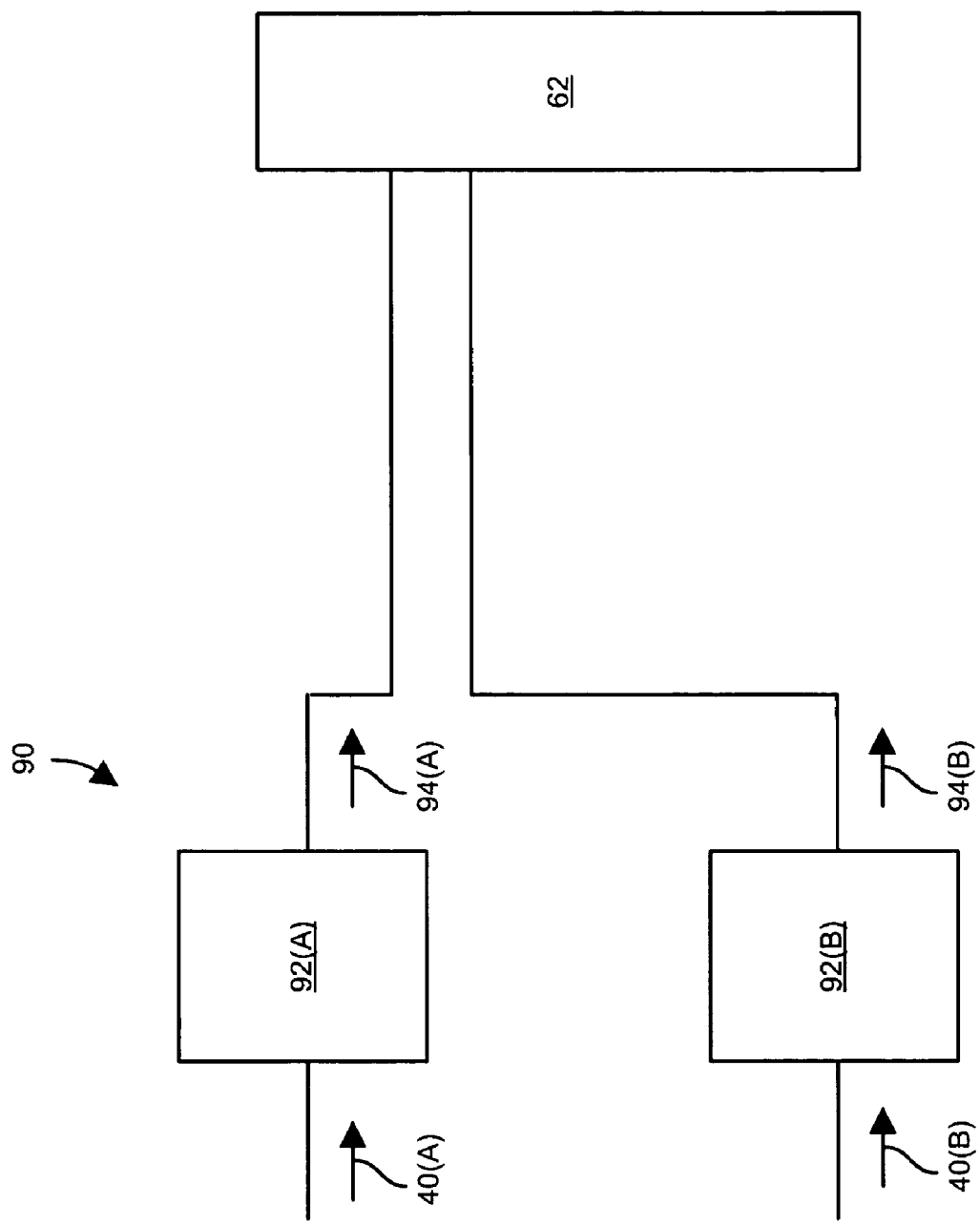
FIG. 3 is a block diagram of another portion of the communications subsystem of the data storage system of FIG. 1.

FIG. 3 shows another portion 90 of the controller 58. As shown, the portion 90 of the controller 58 includes voltage monitors 92(A), 92(B) which respectively couple to the power supplies 32(A), 32(B) of the storage processors 28(A), 28(B) to receive the power supply signals 40(A), 40(B). The voltage monitors 92(A), 92(B) (collectively, voltage monitors 92) further couple to the switch 62 which is disposed along the CMI bus 52 (also see FIG. 1).

The portion 90 is configured to control connectivity of the electrical pathways of the CMI bus 52. In particular, as long as the portion 90 receives both power supply signals 40(A), 40(B), the portion 90 provides switch signals 94(A), 94(B) which close the switch 62 and thus connect the interfaces 50.

However, suppose that one of the power supplies 32 fails (e.g., the power supply 32(B)). In this situation, when the corresponding voltage monitor 92 (e.g., the voltage monitor 92(B)) fails to receive its respective power supply signal 40 (e.g., the power supply signal 40(B)), that voltage monitor 92 opens the switch 62 (e.g., changes the voltage of the switch signal 94(B)) to break the electrical pathways of the CMI bus 52. Accordingly, the interface device 50 of the failed storage processor 28 is not damaged by voltage output by the remaining interface device 50 of the remaining storage processor 28 (e.g., the output drivers of the interface device 50(B) are not permanently damaged by the voltage provided by the interface device 50(A) while the core of the interface device 50(B) is un-powered). Moreover, pull-ups on the CMI bus 52 will prevent the interface device 50(A) from sustaining damage. Since there is no long term damage, the amount of time, effort and costs associated with recovering from the failure is minimized. Further detail of embodiments of the invention will now be provided with reference to FIG. 4.

Figure 4:
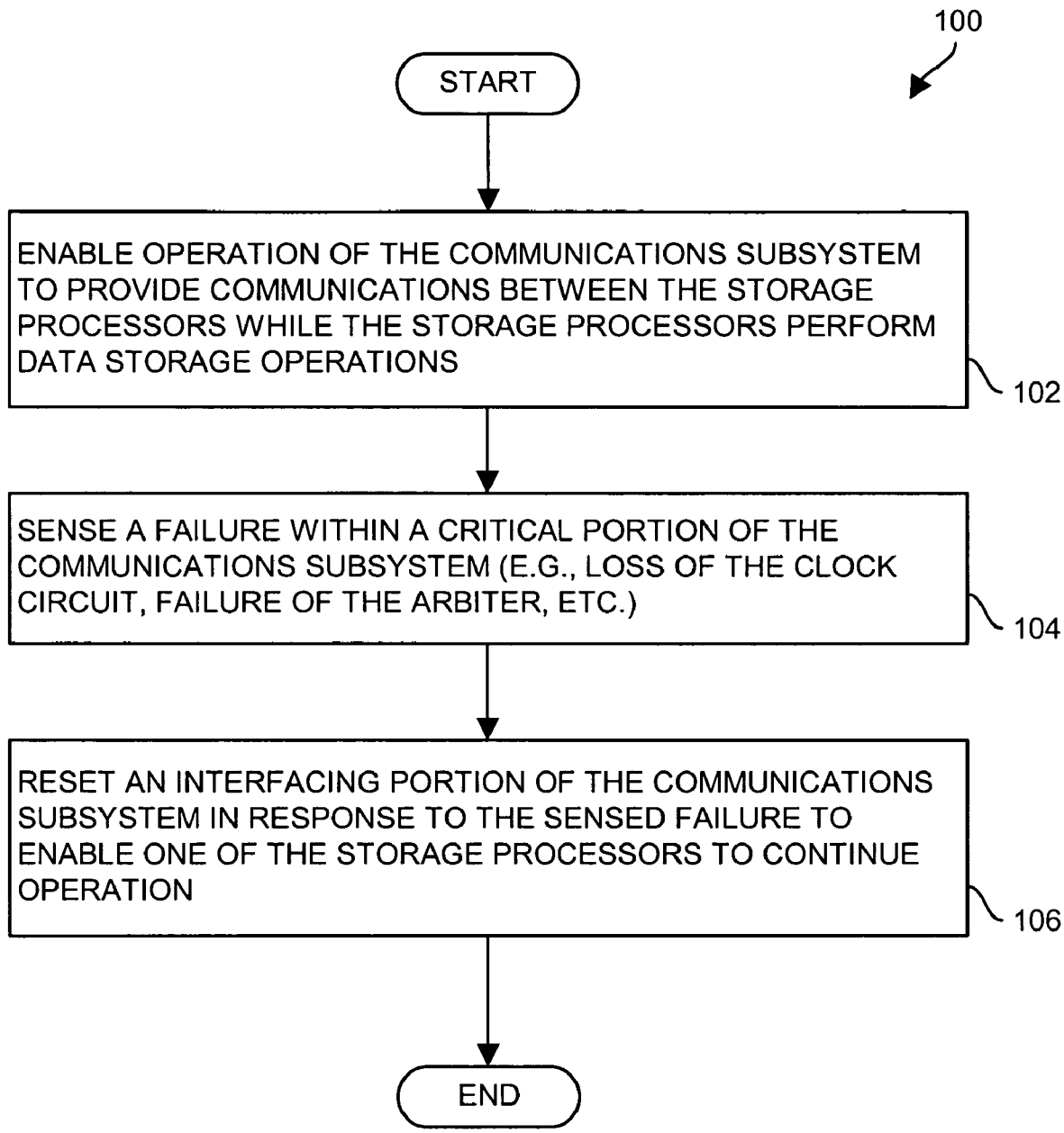
FIG. 4 is a flowchart of a procedure performed by the communications subsystem during a failure.

FIG. 4 is a flowchart of a procedure 100 summarizing the operation of the watchdog circuit 60 of the communications subsystem 30 during a particular failure. In step 102, while the storage processors 28 perform data storage operations, the watchdog circuit 60 enables the interface devices 50 of the communications subsystem 30 to provide CMI communications between the storage processors 28.

In step 104, the watchdog circuit 60 senses a failure within a critical portion of the communications subsystem. For example, the watchdog circuit 60 determines that either the clock circuit 56 or the arbiter 72 has failed.

In step 106, the watchdog circuit 60 resets the interfacing portion 46 of the communications subsystem 30 in response to the sensed failure to enable one of the storage processors 28 to continue operation. Such operation enables the data storage system 20 to remain available even after occurrence of the failure.

As described above, embodiments of the invention are directed to techniques for maintaining operation of a data storage system 20 having multiple storage processors 28 during a failure (e.g., a single point failure within a portion of a communications subsystem 30 disposed between the storage processors 28). In particular, such techniques guard against inadvertently locking up a remaining storage processor 28 to preserve availability of the data storage system 20 as a whole (i.e., to enable a storage processor 28 to continue to operate). Additionally, such techniques enable the use of less expensive, standard power supplies 32(A), 32(B) to power each storage processor 28(A), 28(B) separately and to provide shared power locally for shared resources such as the communications subsystem 30 thus providing both a costs savings as well as reliable fault tolerance. That is, these techniques enable the use of a low cost commodity part to reduce total costs without compromising overall reliability.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the communications pathway between the storage processing circuits 24 was explained above as being a CMI bus by way of example only. Other communications pathways are suitable for use as well such as standard communications paths including a PCI bus, GP/IO lines, wireless pathways, optical pathways, and the like.

Additionally, it should be understood that the data storage system 20 was described above as including two storage processors 28 by way of example only. In other arrangements, the data storage system 20 has a different number of storage processors 28 (e.g., three, four, etc.). Moreover, such arrangements can include different communication configurations such as a multi-drop bus protocol rather than a CMI path. Such modifications and enhancements are intended to belong to various embodiments of the invention.

What is claimed is:

1. A data storage system, comprising:
   a first storage processor;
   a second storage processor; and
   a communications subsystem having (i) an interfacing portion interconnected between the first storage processor and the second storage processor, (ii) a clock circuit coupled to the interfacing portion, and (iii) a controller coupled to the interfacing portion and the clock circuit, the controller being configured to:
      enable operation of the interfacing portion to provide communications between the first and second storage processors;
      sense a failure within the clock circuit; and
      reset the interfacing portion in response to the sensed failure to enable one of the first and second storage processors to continue operation;
   wherein the controller of the communications subsystem includes:
      a watchdog stage which is configured to generate an error signal in response to loss of a clock signal from the clock circuit within a predetermined timeout period;
   wherein the interfacing portion of the communications subsystem includes a first interface device coupled to the first storage processor, a second interface device coupled to the second storage processor, and a communications bus connecting the first and second interface devices together;
   wherein the controller of the communications subsystem further includes:
      an output stage coupled to the watchdog stage, the output stage being configured to provide a reset signal to the first interface device in response to the error signal, the reset signal enabling the second storage processor to continue operation;
   wherein (i) the first interface device is disposed at one end of the communications bus and (ii) the second interface device is disposed at another end of the communications bus to form a communications pathway between the first and second storage processors; and
   wherein the controller, when enabling operation of the interfacing portion, is configured to:
      direct the first interface device coupled to the first storage processor and the second interface device coupled to the second storage processor to concurrently operate as communications end points of the communications pathway formed between the first and second storage processors to exchange cached data between the first and second storage processors through the first interface device, the second interface device and the communications bus.

2. The data storage system of claim 1 wherein the interfacing portion of the communications subsystem includes a Cache Mirroring Interface (CMI) bus.

3. The data storage system of claim 2 wherein the interfacing portion of the communications subsystem further includes:
   a first interface device having a first PCI interface coupled to the first storage processor and a first CMI interface coupled to the CMI bus, and
   a second interface device having a second PCI interface coupled to the second storage processor and a second CMI interface coupled to the CMI bus.

4. The data storage system of claim 1 wherein the interfacing portion of the communications subsystem includes:
   a first interface coupled to the first storage processor;
   a second interface coupled to the second storage processor; and
   a switch coupled to the controller of the communications subsystem, the switch being disposed between the first and second interface.

5. The data storage system of claim 4 wherein the first storage processor receives power from a first power supply, wherein the second storage processor receives power from a second power supply, and wherein the controller of the communications subsystem is further configured to:
   open the switch in response to loss of a power supply signal from one of the first and second power supplies.

6. A communications subsystem for a data storage system having a first storage processor and a second storage processor, the communications subsystem comprising:
   an interfacing portion configured to interconnect the first storage processor with the second storage processor;
   a clock circuit coupled to the interfacing portion; and
   a controller coupled to the interfacing portion and the clock circuit, the controller being configured to:
      enable operation of the interfacing portion to provide communications between the first and second storage processors;
      sense a failure within the clock circuit; and
      reset the interfacing portion in response to the sensed failure to enable one of the first and second storage processors to continue operation;
   wherein the controller includes:
      a watchdog stage which is configured to generate an error signal in response to loss of a clock signal from the clock circuit within a predetermined timeout period;
   wherein the interfacing portion includes a first interface device configured to couple to the first storage processor, a second interface device configured to couple to the second storage processor, and a communications bus connecting the first and second interface devices together;
   wherein the controller further includes:
      an output stage coupled to the watchdog stage, the output stage being configured to provide a reset signal to the first interface device in response to the error signal, the reset signal enabling the second storage processor to continue operation;
   wherein (i) the first interface device is disposed at one end of the communications bus and (ii) the second interface device is disposed at another end of the communications bus to form a communications pathway between the first and second storage processors; and
   wherein the controller, when enabling operation of the interfacing portion, is configured to:
      direct the first interface device coupled to the first storage processor and the second interface device coupled to the second storage processor to concurrently operate as communications end points of the communications pathway formed between the first and second storage processors to exchange cached data between the first and second storage processors through the first interface device, the second interface device and the communications bus.

7. The communications subsystem of claim 6 wherein the interfacing portion includes a Cache Mirroring Interface (CMI) bus.

8. The communications subsystem of claim 7 wherein the interfacing portion further includes:
a first interface device having a first PCI interface configured to couple to the first storage processor and a first CMI interface configured to couple to the CMI bus, and
a second interface device having a second PCI interface configured to couple to the second storage processor and a second CMI interface configured to couple to the CMI bus.

9. The communications subsystem of claim 6 wherein the interfacing portion of the communications subsystem includes:
a first interface coupled to the first storage processor;
a second interface coupled to the second storage processor; and
a switch coupled to the controller, the switch being disposed between the first and second interface.

10. The communications subsystem of claim 9 wherein the first storage processor receives power from a first power supply, wherein the second storage processor receives power from a second power supply, and wherein the controller is further configured to:
open the switch in response to loss of a power supply signal from one of the first and second power supplies.

11. In a data storage system having (i) a first storage processor, (ii) a second storage processor and (iii) a communications subsystem coupled to the first and second storage processors, a method for operating the data storage system during a failure within the communications subsystem, the method comprising:
while the first and second storage processors perform data storage operations, enabling operation of the communications subsystem to provide communications between the first and second storage processors;
sensing a failure within a critical portion of the communications subsystem; and
resetting an interfacing portion of the communications subsystem in response to the sensed failure to enable one of the first and second storage processors to continue operation;
wherein the communications subsystem is configured to exchange cached data for cache coherency between the first and second storage processors; and
wherein sensing the failure within the critical portion of the communications subsystem includes detecting a malfunction within the communication subsystem which prevents the communications subsystem from exchanging cached data for cache coherency between the first and second storage processors.

12. In a data storage system having (i) a first storage processor, (ii) a second storage processor and (iii) a communications subsystem coupled to the first and second storage processors, a method for operating the data storage system during a failure within the communications subsystem, the method comprising:
while the first and second storage processors perform data storage operations, enabling operation of the communications subsystem to provide communications between the first and second storage processors;
sensing a failure within a critical portion of the communications subsystem: and
resetting an interfacing portion of the communications subsystem in response to the sensed failure to enable one of the first and second storage processors to continue operation;
wherein the critical portion of the communications subsystem includes clock circuitry;
wherein sensing the failure includes:
generating an error signal in response to loss of a clock signal from the clock circuitry within a predetermined timeout period;
wherein the communications subsystem includes a first interface device coupled to the first storage processor, and a second interface device coupled to the second storage processor, the first and second interface devices being connected together through a communications bus;
wherein resetting the interfacing portion includes:
outputting a reset signal to the first interface device to enable the second storage processor to continue operation; and
wherein (i) the first interface device is disposed at one end of the communications bus and (ii) the second interface device is disposed at another end of the communications bus to form a communications pathway between the first and second storage processors; and
wherein enabling operation of the communications subsystem to provide the communications between the first and second storage processors includes:
directing the first interface device coupled to the first storage processor and the second interface device coupled to the second storage processor to concurrently operate as communications end points of the communications pathway formed between the first and second storage processors to exchange cached data between the first and second storage processors through the first interface device, the second interface device and the communications bus.

* * * * *